United States Patent
Abernathy et al.

(10) Patent No.: US 7,689,812 B2
(45) Date of Patent: Mar. 30, 2010

(54) METHOD AND SYSTEM FOR RESTORING REGISTER MAPPER STATES FOR AN OUT-OF-ORDER MICROPROCESSOR

(75) Inventors: Christopher M. Abernathy, Austin, TX (US); Mary D. Brown, Austin, TX (US); Dung Q. Nguyen, Austin, TX (US); Joel A. Silberman, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 413 days.

(21) Appl. No.: 11/674,754

(22) Filed: Feb. 14, 2007

(65) Prior Publication Data

US 2008/0195850 A1  Aug. 14, 2008

(51) Int. Cl.
G06F 15/00 (2006.01)
G06F 9/00 (2006.01)
(52) U.S. Cl. .................. 712/216; 712/233; 712/239
(58) Field of Classification Search ........... 712/220, 712/216, 233, 239
See application file for complete search history.

(56) References Cited

U.S. PATENT DOCUMENTS 7,263,600 B2 * 8/2007 Sander et al. ............... 712/218
7,401,209 B2 * 7/2008 Altman et al. .............. 712/225
2004/0177239 A1 * 9/2004 Clift et al. .................. 712/228
2005/0247774 A1 * 11/2005 Sander et al. ............... 235/375

* cited by examiner

Primary Examiner—Aimee J Li
(74) Attorney, Agent, or Firm—Dillon & Yudell LLP

(57) ABSTRACT

A method of restoring register mapper states for an out-of-order microprocessor. A processor maps a logical register to a physical register in a map table in response to a first instruction. Instruction sequencing logic records a second speculatively executed instruction as a most recently dispatched instruction in the map table when the second instruction maps the same logical register of the first instruction. The instruction sequencing logic sets an evictor instruction tag (ITAG) of the first instruction in the map table when the second instruction maps a same logical register of the first instruction. The instruction sequencing logic detects mispredicted speculative instructions, determines which instructions in the map table were dispatched prior to the mispredicted speculative instructions, and restores the map table to a state prior to the mispredicted speculative instructions by utilizing the evictor ITAG to restore one or more A bits in the map table data structure.

18 Claims, 3 Drawing Sheets

METHOD AND SYSTEM FOR RESTORING REGISTER MAPPER STATES FOR AN OUT-OF-ORDER MICROPROCESSOR

BACKGROUND OF THE INVENTION

1. Technical Field

The present invention relates in general to data processing systems and in particular to microprocessors. Still more particularly, the present invention relates to an improved method and system for restoring register mapper states for an out-of-order microprocessor.

2. Description of the Related Art

Conventional microprocessors utilize on-chip cache memory to increase memory access rates. Cache memory includes one or more levels of dedicated high-speed memory for storing recently accessed instructions and data. Cache memory technology is based on the premise that microprocessors frequently re-execute the same instructions and/or execute different instructions using recently accessed data. An instruction that depends on one or more preceding instructions to load required data into working operand registers cannot execute until all of the required data has been retrieved from cache or main memory. Furthermore, execution units cannot predict how long it may take to load data into the working operand registers. Older microprocessors handled this uncertainty by delaying execution until the required data is fetched (i.e., by "stalling" the execution pipeline).

Conventional microprocessors utilize speculative instruction execution to address pipeline stalls by enabling a second instruction that is data-dependent on a first instruction to enter an execution pipeline before the first instruction has passed completely through the execution pipeline. In microprocessors that utilize speculative instruction execution, there is a delay between the decision to issue an instruction and the actual execution of the instruction. Thus, in the case of load instructions, there may be a significant delay between the issue of a load instruction and the corresponding data fetch from cache memory. A consumer load instruction, dependent on a delayed instruction, may be issued before confirmation by the cache system that the required load data is available in the cache. When the required load data is not found in the cache, dependent consumer load instructions can execute and access incorrect data.

In order to maintain correctness, microprocessors flush incorrectly executed speculative instructions and their results. Conventional microprocessors detect and correct such misspeculation by tracking instruction dependencies using large physical register mappers, taking "snapshots" of the entire mapper before every instruction dispatch, and rolling back the snapshots to the one taken just before the instruction(s) that caused the exception. The register mappers enable dependency chains to be established based on the snapshots. However these register mapper snapshots are complex and typically consume large amounts of area and power, since many snapshots are usually needed. To enable recovery from cache flushes, microprocessors can also save a previous physical register state for each instruction group and for each physical register type, but this also requires a large amount of memory area and slows the process of register state recovery.

SUMMARY OF THE INVENTION

Disclosed are a method, system, and computer readable-medium for restoring register mapper states for an out-of-order microprocessor. In one embodiment, the method includes, but is not limited to, the steps of: mapping a logical register to a physical register in a map table data structure in response to a first instruction; recording a second instruction as a most recently dispatched instruction in the map table data structure when the second instruction maps the logical register to the physical register, wherein the second instruction is executed speculatively by an execution unit; setting an evictor instruction tag (ITAG) of the first instruction in the map table data structure when the second instruction maps the logical register of the first instruction to a same logical register of the first instruction; detecting a mispredicted speculative instruction; determining which instructions in the map table data structure were dispatched prior to the mispredicted speculative instruction; and restoring the map table data structure to a state prior to the mispredicted speculative instruction by utilizing the evictor ITAG to restore one or more A bits in the map table data structure.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method, system, and computer readable-medium for restoring register mapper states for an out-of-order microprocessor.

Figure 1:
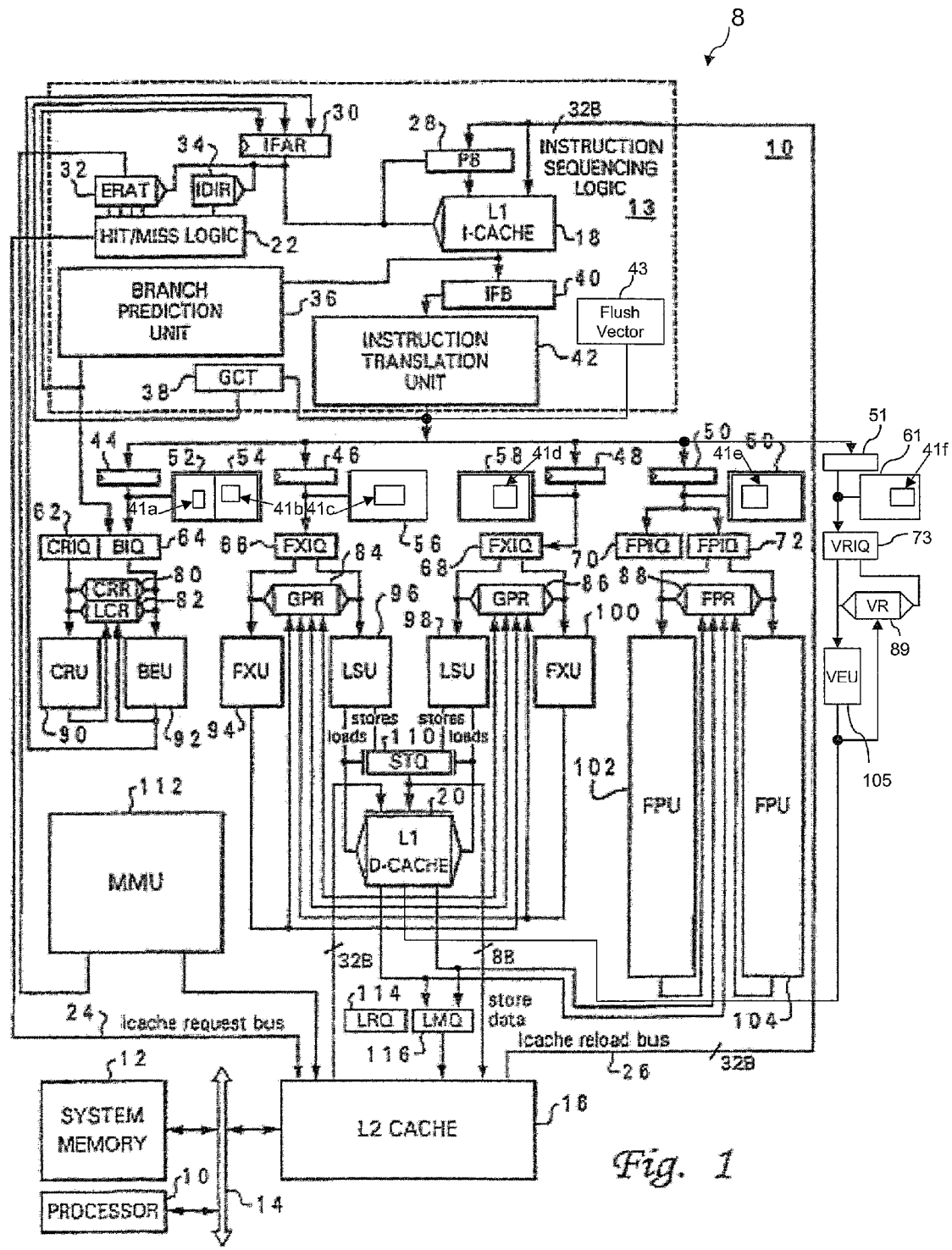
FIG. 1 is an exemplary embodiment of a data processing system, according to the present invention.

With reference now to FIG. 1, there is illustrated a high level block diagram of an exemplary data processing system 8 in accordance with the present invention. As shown, data processing system 8 includes a processor 10 comprising a single integrated circuit superscalar processor, which, as discussed further below, includes various execution units, registers, buffers, memories, and other functional units that are all formed by integrated circuitry. Processor 10 may be coupled to other devices, such as a system memory 12 or a second processor 10, by an interconnect fabric 14 to form a data processing system 8 such as a workstation or server computer system. Processor 10 also includes an on-chip multi-level cache hierarchy including a unified level two (L2) cache 16 and bifurcated level one (L1) instruction (I) and data (D) caches 18 and 20, respectively. As is well known to those skilled in the art, caches 16, 18 and 20 provide low latency access to cache lines corresponding to memory locations in system memory 12.

Instructions are fetched and ordered for processing by instruction sequencing logic 13 within processor 10. In the depicted embodiment, instruction sequencing logic 13 includes an instruction fetch address register (IFAR) 30 that contains an effective address (EA) indicating a cache line of instructions to be fetched from L1 I-cache 18 for processing. During each cycle, a new instruction fetch address may be loaded into IFAR 30 from one of at least three sources: branch prediction unit (BPU) 36, which provides speculative target path addresses resulting from the prediction of conditional branch instructions, global completion table (GCT) 38, which provides sequential path addresses, and branch execution unit (BEU) 92, which provides non-speculative addresses resulting from the resolution of predicted conditional branch instructions.

If hit/miss logic 22 determines, after translation of the EA contained in IFAR 30 by effective-to-real address translation (ERAT) 32 and lookup of the real address (RA) in I-cache directory 34, that the cache line of instructions corresponding to the EA in IFAR 30 does not reside in L1 I-cache 18, then hit/miss logic 22 provides the RA to L2 cache 16 as a request address via I-cache request bus 24. Such request addresses may also be generated by prefetch logic within L2 cache 16 or elsewhere within processor 10 based upon recent access patterns. In response to a request address, L2 cache 16 outputs a cache line of instructions, which are loaded into prefetch buffer (PB) 28 and L1 I-cache 18 via I-cache reload bus 26.

Once the cache line specified by the EA in IFAR 30 resides in L1 cache 18, L1 I-cache 18 outputs the cache line to both branch prediction unit (BPU) 36 and to instruction fetch buffer (IFB) 40. BPU 36 scans the cache line of instructions for branch instructions and predicts the outcome of conditional branch instructions, if any. Following a branch prediction, BPU 36 furnishes a speculative instruction fetch address to IFAR 30, as discussed above, and passes the prediction to branch instruction queue 64 so that the accuracy of the prediction can be determined when the conditional branch instruction is subsequently resolved by BEU 92.

IFB 40 temporarily buffers the cache line of instructions received from L1 I-cache 18 until the cache line of instructions can be translated by instruction translation unit (ITU) 42. In the illustrated embodiment of processor 10, ITU 42 translates instructions from user instruction set architecture (UISA) instructions (e.g., PowerPC® instructions) into a possibly different number of internal ISA (IISA) instructions that are directly executable by the execution units of processor 10. Such translation may be performed, for example, by reference to microcode stored in a read-only memory (ROM) template.

Figure 2:
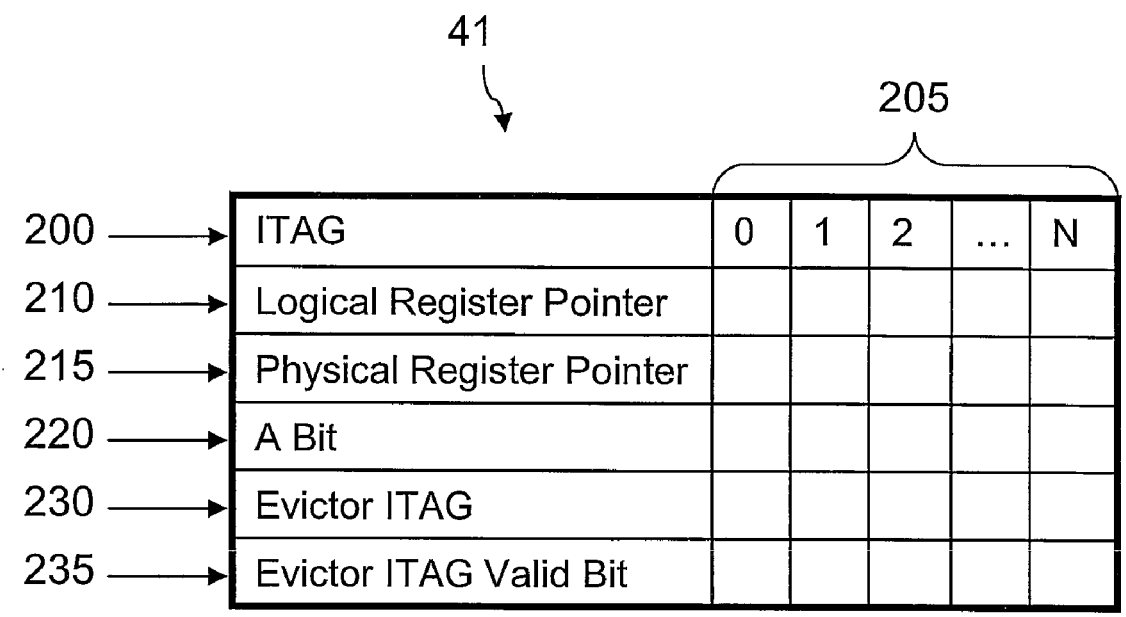
FIG. 2 illustrates an instruction map table, according to an embodiment of the present invention.
Figure 3:
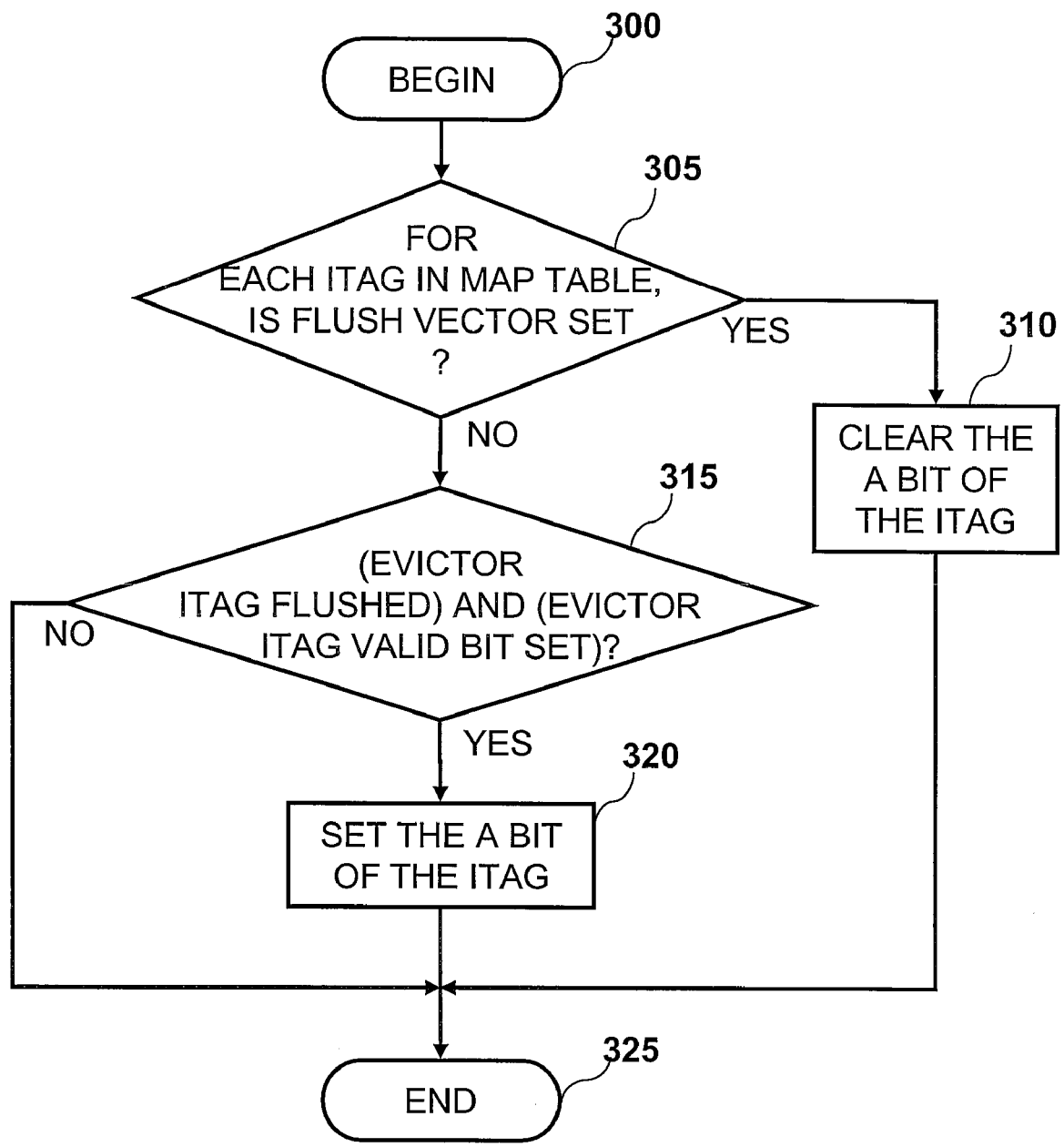
FIG. 3 is a high level logical flowchart of an exemplary method of restoring register mapper states for an out-of-order microprocessor, according to an embodiment of the invention.

Following UISA-to-IISA instruction translation, instructions are dispatched in-order to one of latches 44, 46, 48, 50, and 51 according to instruction type. That is, branch instructions and other condition register (CR) modifying instructions are dispatched to latch 44, fixed-point and load-store instructions are dispatched to either of latches 46 and 48, and floating-point instructions are dispatched to latch 50 and vector instructions are dispatched to latch 57. Each instruction requiring a rename register for temporarily storing execution results is then assigned one or more registers within a register file by the appropriate one of CR mapper 52, link and count register (LCR) mapper 54, exception register (XER) mapper 56, general-purpose register (GPR) mapper 58, floating-point register (FPR) mapper 60, and vector register (VR) last mapper 61. Information regarding the dependencies of each instruction is stored in map tables 41a-41f, which are included within the register mapper corresponding to each instruction, for comparison against a flush vector 43, as illustrated in FIGS. 2 and 3, which are discussed below.

The dispatched instructions are then temporarily placed in an appropriate one of CR issue queue (CRIQ) 62, branch issue queue (BIQ) 64, fixed-point issue queues (FXIQs) 66 and 68, floating-point issue queues (FPIQs) 70 and 72, and VR issue queue (VRIQ) 73. From issue queues 62, 64, 66, 68, 70, 72, and 73, instructions can be issued opportunistically (i.e., possibly out-of-order) to the execution units of processor 10 for execution.

As illustrated, the execution units of processor 10 include a CR unit (CRU) 90 for executing CR-modifying instructions, a branch execution unit (BEU) 92 for executing branch instructions, two fixed-point units (FXUs) 94 and 100 for executing fixed-point instructions, two load-store units (LSUs) 96 and 98 for executing load and store instructions, two floating-point units (FPUs) 102 and 104 for executing floating-point instructions, and vector execution unit (VEU) 105 for executing vector instructions. Each of execution units 90-105 is preferably implemented as an execution pipeline having a number of pipeline stages.

During execution within one of execution units 90-105, an instruction receives operands, if any, from one or more architected and/or rename registers within a register file coupled to the execution unit. When executing CR-modifying or CR-dependent instructions, CRU 90 and BEU 92 access the CR register file 80, which in a preferred embodiment contains a CR and a number of CR rename registers that each comprise a number of distinct fields formed of one or more bits. LCR register file 82 contains a count register (CTR), a link register (LR) and rename registers of each, by which BEU 92 may also resolve conditional branches to obtain a path address. Similarly, when executing vector instructions, VEU 105 accesses the VR register file 89, which in a preferred embodiment contains multiple VRs and a number of VR rename registers. GPRs 84 and 86, which are synchronized, duplicate register files, store fixed-point and integer values accessed and produced by FXUs 94 and 100 and LSUs 96 and 98. FPR file 88, which like GPRs 84 and 86 may also be implemented as duplicate sets of synchronized registers, contains floating-point values that result from the execution of floating-point instructions by FPUs 102 and 104 and floating-point load instructions by LSUs 96 and 98.

After an execution unit finishes execution of an instruction, the execution notifies GCT 38, which schedules completion of instructions in program order. To complete an instruction executed by one of CRU 90, FXUs 94 and 100, FPUs 102 and 104, or VEU 105, GCT 38 signals the appropriate mapper. The instruction is then removed from the issue queue, and once all instructions within its instruction group have completed, is removed from GCT 38. Other types of instructions, however, are completed differently.

When BEU 92 determines the path address of the execution path that should be taken, the path address is compared against the speculative path address predicted by BPU 36. If the path addresses match, BPU 36 updates its prediction facilities, if necessary. If, however, the calculated path address does not match the predicted path address, BEU 92 supplies the correct path address to IFAR 30, and BPU 36 updates its prediction facilities. In either event, the branch instruction can then be removed from BIQ 64, and when all other instructions within the same instruction group have completed, from GCT 38.

Following execution of a load instruction (including a load-reserve instruction), the real address is provided to L1 D-cache 20 as a request address. At this point, the load operation is removed from FXIQ 66 or 68 and placed in load data queue (LDQ) 114 until the indicated load is performed. If the request address misses in L1 D-cache 20, the request address is placed in load miss queue (LMQ) 116, from which the requested data is retrieved from L2 cache 16, and failing that, from another processor 10 or from system memory 12. Store instructions (including store-conditional instructions) are similarly completed utilizing a store queue (SOT) 110 into which effective addresses for stores are loaded following execution of the store instructions.

With reference now to FIG. 2, there is depicted a more detailed view of map tables 41a-41f (from FIG. 1), according to an embodiment of the invention. As shown, map tables 41a-41f include a unique instruction tag (ITAG) 200 for each instruction that is in flight within processor 10. Map tables 41a-41f include multiple columns 205, which are numbered 0 through N, where N is the total number of instructions in flight. Map tables 41a-41f also include a logical register pointer 210, a physical register pointer 215, and an A bit 220 for each ITAG 200. A bit 220 is a binary value, which when set (i.e., equal to 1) shows that the corresponding ITAG 200 contains the most recent "youngest" values of a given logical register pointer 210.

According to the illustrative embodiment, map tables 41a-41f also include an evictor ITAG 230 and an evictor ITAG valid bit 235. When a newly-dispatched instruction sets an A bit 220 of a logical register, thereby "evicting" an existing entry that matches the same logical register pointer 210, instruction sequencing logic 13 stores the dispatched instruction's ITAG 200 in the evicted instruction's evictor ITAG 230 field. When an exception occurs (e.g., a mispredicted branch instruction), instruction sequencing logic 13 utilizes flush vector 43 (FIG. 1), evictor ITAG 230, and evictor ITAG valid bit 235 to restore A bits 220 within map tables 41a-41f to match the states of A bits 220 prior to the exception. The flush recovery process is illustrated in FIG. 3, which is discussed below.

Evictor ITAG valid bit 235 initially contains a default value of 0. When a newly dispatched ITAG 200 evicts an entry in map tables 41a-41f (i.e., at the same time that evictor ITAG 230 is stored for the entry), instruction sequencing logic 13 sets evictor ITAG valid bit 235 equal to 1. Instruction sequencing logic 13 can later clear evictor ITAG valid bit 235 if a given entry within map tables 41a-41f is invalidated (e.g., due to a flush or a completion). Evictor ITAG valid bit 235 thus prevents future broadcasts of flush vector 43 by instruction sequencing logic 13 from incorrectly setting A bits 220 for invalid entries in map tables 41a-41f, which would otherwise lead to an incorrect state. In one embodiment, if evictor ITAG 230 is flushed, but the corresponding ITAG 200 is not flushed, then evictor ITAG 230 is no longer valid and thus would need to be cleared after the corresponding A bit 220 was restored to a 1.

In another embodiment, map tables 41a-41f may not include evictor ITAG valid bit 235. Instruction sequencing logic 13 may instead utilize out-of-range values (i.e., values that will never be compared against flush vector 43) for evictor ITAG 230 when evictor ITAG 230 is not valid. The fields of evictor ITAG 230 may therefore be initially out of range; set in range upon a valid eviction; set back out of range when a given entry in map tables 41a-41f is invalidated (e.g., due to a completion or a flush); and/or set back out of range when evictor ITAG 230 is flushed.

Turning now to FIG. 3, there is illustrated a high level logical flowchart of an exemplary method of restoring register mapper states for an out-of-order microprocessor, according to an embodiment of the invention. The flush recovery process begins at block 300 in response to instruction sequencing logic 13 (from FIG. 1) detecting an exception, mispredicted instruction, or the like. At block 305, a determination is made for each ITAG 200 (from FIG. 2) whether flush vector 43, which is broadcast from instruction sequencing logic 13 for comparison against each ITAG 200 and evictor ITAG 230, is set (i.e., equal to 1). If flush vector 43 (FIG. 1) is set (i.e., equal to 1) for one or more ITAGs 200 (also referred to as "flushed" ITAGs), instruction sequencing logic 13 clears (i.e., sets equal to 0) A bits 220 and evictor ITAG valid bits 235 for each of the corresponding one or more flushed ITAGs 200, as depicted in block 310. No further action is taken for the flushed ITAGs 200 and the flush recovery process terminates at block 325.

If flush vector 43 is not set (i.e., equal to 0) for one or more ITAGs 200, a determination is made whether evictor ITAG 230 (FIG. 2) is flushed and evictor ITAG valid bit 235 (FIG. 2) is set (i.e., equal to 1) for the one or more ITAGs 200, as shown in block 315. If evictor ITAG 230 is not flushed or evictor ITAG valid bit 235 is not set (i.e., equal to 0), no further action is taken and the flush recovery process terminates at block 325.

If evictor ITAG 230 is flushed and evictor ITAG valid bit 235 is set (i.e., equal to 1) for one or more ITAGs 200 (also referred to as "youngest" ITAGs), instruction sequencing logic 13 sets (i.e., sets equal to 1) A bits 220 for each of the corresponding one or more youngest ITAGs 200, as shown in block 320. No further action is taken for the youngest ITAGs 200 and the flush recovery process terminates at block 325.

The present invention thus enables processor 10 (FIG. 1) to map a logical register to a physical register in map tables 41a-41f (FIG. 1) in response to a first instruction. Instruction sequencing logic 13 (FIG. 1) records a second instruction as a most recently dispatched instruction in map tables 41a-41f by setting A bits 220 (FIG. 2) when the second instruction maps the same logical register as the first instruction, wherein the second instruction is executed speculatively by processor 10. Instruction sequencing logic 13 also sets evictor ITAG 230 (FIG. 2) of the first instruction in map tables 41a-41f when the second instruction maps the logical register of the first instruction to the same logical register of the first instruction. Instruction sequencing logic 13 can detect a mispredicted speculative instruction and subsequently determines which instructions in map tables 41a-41f were dispatched prior to the mispredicted speculative instruction by comparing each of the instructions in map tables 41a-41f to flush vector 43, which corresponds to the most recently dispatched instructions prior to the mispredicted speculative instruction. Instruction sequencing logic 13 then restores map tables 41a-41f to a state prior to the mispredicted speculative instruction by utilizing evictor ITAG 230 to restore one or more A bits 220 in map tables 41a-41f. Instruction sequencing logic 13 can thus refer to map tables 41a-41f, which occupy less space and consume less power than conventional instruction tracking logic, to perform flush recovery operations.

Restoring map tables 41a-41f includes setting A bits 220 in map tables 41a-41f for each instruction that was a most recently dispatched instruction to map a logical register to a physical register prior to the mispredicted speculative instruction, and clearing A bits 220 in map tables 41a-41f for each instruction that was not a most recently dispatched instruction to map a logical register to a physical register prior to the mispredicted speculative instruction. In one embodiment, instruction sequencing logic 13 sets A bits 220 in response to: flush vector 43 that corresponds to a most recently dispatched instruction prior to the mispredicted speculative instruction not being set; evictor ITAG 230 being set in said map table data structure; and evictor ITAG valid bit 235 (FIG. 2) being set in map tables 41a-41f. In another embodiment, instruction sequencing logic 13 sets A bits 220 in response to: flush vector 43 that corresponds to a most recently dispatched instruction prior to the mispredicted speculative instruction not being set; and evictor ITAG 230 being set in a range comparable to flush vector 43 in response to a valid eviction of a first instruction by a second instruction in map tables 41a-41f.

It is understood that the use herein of specific names are for example only and not meant to imply any limitations on the invention. The invention may thus be implemented with different nomenclature/terminology and associated functionality utilized to describe the above devices/utility, etc., without limitation.

While an illustrative embodiment of the present invention has been described in the context of a fully functional computer system with installed software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as thumb drives, floppy disks, hard drives, CD ROMs, DVDs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. In a processor, a method comprising:
   mapping a logical register to a physical register in a map table data structure in response to a first instruction;
   recording a second instruction as a most recently dispatched instruction in said map table data structure when said second instruction maps said logical register to said physical register, wherein said second instruction is executed speculatively by an execution unit;
   setting an evictor instruction tag (ITAG) of said first instruction in said map table data structure when said second instruction maps to a same logical register of said first instruction;
   detecting a mispredicted speculative instruction;
   determining which instructions in said map table data structure were dispatched prior to said mispredicted speculative instruction; and
   restoring said map table data structure to a state prior to said mispredicted speculative instruction by utilizing said evictor ITAG to restore one or more A bits in said map table data structure.

2. The method of claim 1, wherein said recording said second instruction as said most recently dispatched instruction further comprises setting an A bit in said map table data structure.

3. The method of claim 1, wherein said determining which instructions in said map table data structure were dispatched prior to said mispredicted speculative instruction further comprises comparing each of said instructions in said map table data structure to a flush vector that corresponds to said most recently dispatched instruction prior to said mispredicted speculative instruction.

4. The method of claim 1, wherein said restoring said map table data structure further comprises:
   setting an A bit in said map table data structure for each instruction that was said most recently dispatched instruction to map said logical register to said physical register prior to said mispredicted speculative instruction; and
   clearing said A bit in said map table data structure for each instruction that was not said most recently dispatched instruction to map said logical register to said physical register prior to said mispredicted speculative instruction.

5. The method of claim 4, wherein the step of setting said A bit is performed in response to:
   a flush vector that corresponds to said most recently dispatched instruction prior to said mispredicted speculative instruction not being set;
   said evictor ITAG being set in said map table data structure; and
   an evictor ITAG valid bit being set in said map table data structure.

6. The method of claim 4, wherein the step of setting said A bit is performed in response to:
   a flush vector that corresponds to said most recently dispatched instruction prior to said mispredicted speculative instruction not being set; and
   said evictor ITAG being set in a range comparable to said flush vector in response to a valid eviction of said first instruction by said second instruction in said map table.

7. A processor comprising:
   an instruction sequencing unit (ISU) that fetches instructions;
   an execution unit that executes instructions, wherein at least some of said instructions are executed speculatively;
   a map table data structure that maps a logical register to a physical register in response to a first instruction;
   means for recording a second instruction as a most recently dispatched instruction in said map table data structure when said second instruction maps said logical register to said physical register;
   means for setting an evictor instruction tag (ITAG) of said first instruction in said map table data structure when said second instruction maps to a same logical register of said first instruction;
   means for detecting a mispredicted speculative instruction;
   means for determining which instructions in said map table data structure were dispatched prior to said mispredicted speculative instruction; and
   means for restoring said map table data structure to a state prior to said mispredicted speculative instruction by utilizing said evictor ITAG to restore one or more A bits in said map table data structure.

8. The processor of claim 7, wherein said means for recording said second instruction as said most recently dispatched instruction further comprises means for setting an A bit in said map table data structure.

9. The processor of claim 7, wherein said means for determining which instructions in said map table data structure were dispatched prior to said mispredicted speculative instruction further comprises means for comparing each of said instructions in said map table data structure to a flush vector that corresponds to said most recently dispatched instruction prior to said mispredicted speculative instruction.

10. The processor of claim 7, wherein said means for restoring said map table data structure further comprises:
   means for setting an A bit in said map table data structure for each instruction that was said most recently dispatched instruction to map said logical register to said physical register prior to said mispredicted speculative instruction; and
   means for clearing said A bit in said map table data structure for each instruction that was not said most recently dispatched instruction to map said logical register to said physical register prior to said mispredicted speculative instruction.

11. The processor of claim 10, wherein said means for setting said A bit further comprises means for setting said A bit in response to:
   a flush vector that corresponds to said most recently dispatched instruction prior to said mispredicted speculative instruction not being set;
   said evictor ITAG being set in said map table data structure; and
   an evictor ITAG valid bit being set in said map table data structure.

12. The processor of claim 10, wherein said means for setting said A bit further comprises means for setting said A bit in response to:
   a flush vector that corresponds to said most recently dispatched instruction prior to said mispredicted speculative instruction not being set; and
   said evictor ITAG being set in a range comparable to said flush vector in response to a valid eviction of said first instruction by said second instruction in said map table.

13. A computer-readable medium encoded with a computer program that, when executed, performs the steps of:
   mapping a logical register to a physical register in a map table data structure in response to a first instruction;
   recording a second instruction as a most recently dispatched instruction in said map table data structure when said second instruction maps said logical register to said physical register, wherein said second instruction is executed speculatively by an execution unit;
   setting an evictor instruction tag (ITAG) of said first instruction in said map table data structure when said second instruction maps to a same logical register of said first instruction;
   detecting a mispredicted speculative instruction;
   determining which instructions in said map table data structure were dispatched prior to said mispredicted speculative instruction; and
   restoring said map table data structure to a state prior to said mispredicted speculative instruction by utilizing said evictor ITAG to restore one or more A bits in said map table data structure.

14. The computer readable-medium of claim 13, wherein said recording said second instruction as said most recently dispatched instruction further comprises setting an A bit in said map table data structure.

15. The computer readable-medium of claim 13, wherein said determining which instructions in said map table data structure were dispatched prior to said mispredicted speculative instruction further comprises comparing each of said instructions in said map table data structure to a flush vector that corresponds to said most recently dispatched instruction prior to said mispredicted speculative instruction.

16. The computer readable-medium of claim 13, wherein said restoring said map table data structure further comprises:
   setting an A bit in said map table data structure for each instruction that was said most recently dispatched instruction to map said logical register to said physical register prior to said mispredicted speculative instruction; and
   clearing said A bit in said map table data structure for each instruction that was not said most recently dispatched instruction to map said logical register to said physical register prior to said mispredicted speculative instruction.

17. The computer readable-medium of claim 16, wherein said setting said A bit is performed in response to:
   a flush vector that corresponds to said most recently dispatched instruction prior to said mispredicted speculative instruction not being set;
   said evictor ITAG being set in said map table data structure; and
   an evictor ITAG valid bit being set in said map table data structure.

18. The computer readable-medium of claim 16, wherein said setting said A bit is performed in response to:
   a flush vector that corresponds to said most recently dispatched instruction prior to said mispredicted speculative instruction not being set; and
   said evictor ITAG being set in a range comparable to said flush vector in response to a valid eviction of said first instruction by said second instruction in said map table.

* * * * *